United States Patent
Dobi et al.

(10) Patent No.: US 11,807,238 B2
(45) Date of Patent: Nov. 7, 2023

(54) DRIVING ASSISTANCE SYSTEM FOR A VEHICLE, VEHICLE HAVING SAME AND DRIVING ASSISTANCE METHOD FOR A VEHICLE

(71) Applicant: Bayerische Motoren Werke Aktiengesellschaft, Munich (DE)

(72) Inventors: Sonila Dobi, Unterschleissheim (DE); Jan-Ullrich Schamburek, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 217 days.

(21) Appl. No.: 15/734,098

(22) PCT Filed: May 23, 2019

(86) PCT No.: PCT/EP2019/063339
§ 371 (c)(1),
(2) Date: Dec. 1, 2020

(87) PCT Pub. No.: WO2020/030315
PCT Pub. Date: Feb. 13, 2020

(65) Prior Publication Data
US 2021/0213951 A1 Jul. 15, 2021

(30) Foreign Application Priority Data
Aug. 9, 2018 (DE) ...................... 10 2018 213 378.6

(51) Int. Cl.
*B60W 30/18* (2012.01)
*B60W 60/00* (2020.01)
(Continued)

(52) U.S. Cl.
CPC .. *B60W 30/18163* (2013.01); *B60W 30/0956* (2013.01); *B60W 40/04* (2013.01);
(Continued)

(58) Field of Classification Search
None
See application file for complete search history.

(56) References Cited

U.S. PATENT DOCUMENTS

| | | | |
|---|---|---|---|
| 2012/0239253 A1 | 9/2012 | Schmidt et al. | |
| 2014/0249722 A1* | 9/2014 | Hegemann | G08G 1/166 701/1 |

(Continued)

FOREIGN PATENT DOCUMENTS

| | | |
|---|---|---|
| CN | 106274480 A | 1/2017 |
| CN | 107430591 A | 12/2017 |

(Continued)

OTHER PUBLICATIONS

English translation of Chinese-language Office Action issued in Chinese Application No. 201980040378.5 dated Jul. 1, 2022 (eight (8) pages).

(Continued)

*Primary Examiner* — Isaac G Smith
*Assistant Examiner* — Nikki Marie M Molina
(74) *Attorney, Agent, or Firm* — Crowell & Moring LLP

(57) ABSTRACT

A driving assistance system for a vehicle includes a reception unit that is configured so as to receive surroundings data of the vehicle, an evaluation unit that is configured, based on the surroundings data, so as to determine a traffic density in a surrounding area of the vehicle, and a determination unit that is configured so as to establish a confidence for the traffic density determined by the evaluation unit.

10 Claims, 3 Drawing Sheets

(51) Int. Cl.
*B60W 30/095* (2012.01)
*B60W 40/04* (2006.01)
*G06V 20/58* (2022.01)
*G06V 20/56* (2022.01)

(52) U.S. Cl.
CPC ......... *B60W 60/0016* (2020.02); *G06V 20/58* (2022.01); *G06V 20/588* (2022.01); *B60W 2554/406* (2020.02)

(56) References Cited

U.S. PATENT DOCUMENTS

| | | | |
|---|---|---|---|
| 2014/0358413 A1 | 12/2014 | Trombley et al. | |
| 2015/0112570 A1* | 4/2015 | Schmudderich | B60W 50/14 701/1 |
| 2016/0210852 A1* | 7/2016 | Buchholz | G08G 1/0129 |
| 2016/0375911 A1 | 12/2016 | Coelingh et al. | |
| 2017/0200371 A1* | 7/2017 | Glander | G08G 1/165 |
| 2018/0001890 A1 | 1/2018 | Ratcliffe | |
| 2020/0180640 A1* | 6/2020 | Luders | B60W 30/18145 |
| 2021/0276563 A1* | 9/2021 | Heitzmann | B60W 40/04 |

FOREIGN PATENT DOCUMENTS

| | | |
|---|---|---|
| DE | 10 2011 014 083 A1 | 9/2012 |
| DE | 10 2014 000 843 A1 | 8/2014 |
| DE | 10 2013 014 872 A1 | 3/2015 |
| DE | 10 2015 000 394 A1 | 7/2016 |
| DE | 10 2016 000 199 A1 | 7/2017 |
| DE | 10 2016 004 726 A1 | 10/2017 |
| DE | 10 2017 100 871 A1 | 7/2018 |
| EP | 3 519 267 B1 | 7/2020 |
| JP | 2009-134496 A | 6/2009 |
| WO | WO 2018/060379 A1 | 4/2018 |
| WO | WO 2018/134139 A1 | 7/2018 |

OTHER PUBLICATIONS

English translation of Chinese-language Office Action issued in Chinese Application No. 201980040378.5 dated Feb. 11, 2022 (10 pages).
International Search Report (PCT/ISA/210) issued in PCT Application No. PCT/EP2019/063339 dated Aug. 30, 2019 with English translation (seven (7) pages).
German-language Written Opinion (PCT/ISA/237) issued in PCT Application No. PCT/EP2019/063339 dated Aug. 30, 2019 (six (6) pages).
German-language Office Action issued in German Application No. 10 2018 213 378.6 dated Oct. 16, 2019 (six (6) pages).

* cited by examiner

DRIVING ASSISTANCE SYSTEM FOR A VEHICLE, VEHICLE HAVING SAME AND DRIVING ASSISTANCE METHOD FOR A VEHICLE

BACKGROUND AND SUMMARY OF THE INVENTION

The disclosure relates to a driving assistance system for a vehicle, a vehicle with the same and a driving assistance method for a vehicle.

The present disclosure relates in particular to a driving assistance system that is set up to carry out an automated driving function with minimized risk. According to a particular aspect, the present disclosure concerns a lane-based traffic density estimation based on sensor-detected lane boundaries and road users as well as an evaluation for driver assistance systems and/or autonomous driving.

Driver assistance systems for (partially) autonomous vehicles are steadily gaining in importance. For example, in the document DE 10 2014 000 843 A1, a lane change assistant is used. After the initiation of a lane change, on the basis of first location and movement data of the vehicle and second location and movement data of vehicles travelling on the target lane, the presence of an adequate traffic gap for the lane change is determined.

In general, detection of the location and movement of vehicles can be faulty. For example, detection of third-party vehicles by an environment sensor of the vehicle may be inaccurate or may not be carried out at all due to the visual conditions or obstructions. If a lane change is still carried out, risk situations may occur. Lane changes thus represent a possible source of danger for the vehicle itself or other road users.

It is an object of the present disclosure to specify a driving assistance system for a vehicle, a vehicle with the same and a driving assistance method for a vehicle which can avoid potential risk situations. In particular, it is an object of the present disclosure to carry out an automated driving function, such as a lane change, with minimal risk.

This object is achieved by the subject matter of the independent claims. Advantageous embodiments are specified in the subordinate claims.

According to one aspect of the present disclosure a driving assistance system is specified for a vehicle, in particular a motor vehicle. The driving assistance system comprises a receiving unit that is set up to receive surroundings data of the vehicle, an evaluation unit that is set up, based on the surroundings data, to determine a traffic density in a surrounding area of the vehicle, and a determination unit which is set up to determine a confidence value for the traffic density determined by the evaluation unit.

According to the invention, a confidence value or reliability value is determined for a calculated traffic density, which indicates the probability that the calculated traffic density is correct. For example, dangerous situations may occur in the event of a faulty calculation of the traffic density. Thus, a nearby approaching vehicle can obscure the view of vehicles driving further back. In addition, there may be vehicles that are not assigned a lane or are assigned the wrong lane, for example at the moment of a lane change. According to the present disclosure, a risk estimation is carried out for performing an automated driving function. If the automated driving function is a lane change and the confidence level of the calculated traffic density is low, for example it can be decided that no lane change will be carried out. This means that potential hazard situations can be avoided if the calculated traffic density is recognized as not trustworthy.

The surroundings data can specify objects and optionally at least one lane. Typically, a detected object is used for the calculation or estimation of traffic density only if the detected object corresponds to at least one predetermined object type. The at least one predetermined object type can be a third-party vehicle, such as a car, truck, or motorcycle. The traffic density can be the number of the third-party vehicles per unit distance at a point in time.

The surroundings data also can specify at least one lane for the objects in some embodiments. In particular, the evaluation unit may be set up to detect the at least one lane based on the surroundings data and to determine the traffic density for the at least one lane. The at least one lane may include a first-party lane of the vehicle and/or at least one adjacent lane of the vehicle and/or at least one opposite direction lane. The term "first-party lane" refers to the lane on which the vehicle is travelling. The term "adjacent lane" means the lane(s) that is or are next to the first-party lane.

In some embodiments the at least one lane may be two or more lanes. Preferably, the evaluation unit is set up to determine a respective traffic density for the two or more lanes. In particular, the third-party vehicles detected by the environment sensor system can be assigned two or more lanes, whereby the respective traffic density can be estimated. The determination unit can be set up to determine an individual confidence value for each of the traffic densities of the two or more lanes. For example, an individual traffic density with an assigned confidence value can be determined for the first-party lane of the vehicle and/or the at least one adjacent lane of the vehicle and/or the at least one opposite direction lane.

In some embodiments, the confidence value may include one or more components. The components can be summed to obtain a total confidence value. In particular, the weighted components can be added. The components can be selected from the group which includes those having (i) a confidence value of objects detected on a lane (for example third-party vehicles) (ii) a confidence value of a detected lane, and (iii) a confidence value of a detection area of an environment sensor system of the vehicle (for example a viewing range of a camera).

Preferably, the driving assistance system comprises a device for an automated driving function. The device for an automated driving function may comprise a lane change assistant and/or an emergency stop assistant. The device may be set up to carry out the automated driving function when the detected confidence level is greater than or equal to a threshold value. In particular, the surroundings of the vehicle can be selectively analyzed based on an automated driving function to be carried out, for example, an emergency stop and/or a lane change, in order to avoid possible dangerous situations.

Additionally or alternatively, the driving assistance system can provide a feedback function. For example, the traffic density and optionally the determined confidence value can be transmitted to a backend. The backend can, for example, be used to learn a road utilization (for example little used roads and much travelled roads). The learned road utilization can be used for more efficient routing in a navigation system.

Preferably, the driving assistance system is set up to carry out a plausibility check for at least one particular environmental characteristic of the motor vehicle based on the determined traffic density and confidence value. For example, the determined environmental characteristics may specify a first-party lane or an opposite direction lane or the presence thereof. The at least one environmental characteristic can be determined based on the surroundings data or can be derived from this. The determined traffic density and confidence value can be used to for example to check whether the environmental characteristic has been correctly determined, i.e. whether the detected environmental characteristic is, for example, actually a first-party lane or an opposite direction lane. In this way, stabilization can be carried out of an environment model, which can for example be used as an input to various functions, such as diverse driving assistance systems (for example a lane change assistant and/or an emergency stop assistant).

The surroundings data, which are used in particular for determining the traffic density and optionally for detecting the at least one lane, can be recorded by an environment sensor system of the vehicle. The environment sensor system can, for example, comprise a LiDAR system, one or more radar systems and/or one or more multiple cameras. The captured surroundings data can be evaluated to determine the traffic density and optionally to determine the at least one lane. The traffic density can be used for a plausibility check of the at least one detected lane.

For example, the surroundings data can include location data and/or movement data (for example (mean) speeds, accelerations, etc.) of third-party vehicles, from which the current traffic density for a defined surrounding area of the vehicle can be determined. Optionally, the captured surroundings data can be evaluated to detect at least one lane. For example, the at least one lane can be detected by means of color markings and/or structural limitations. In some embodiments, additionally or alternatively to the surroundings data of the environment sensor system, position data of the vehicle, such as GPS data and map data of a navigation system, can be used to detect the at least one lane.

According to another aspect of the present disclosure, a vehicle is specified comprising the driving assistance system according to the embodiment of the present disclosure. The term vehicle includes cars, trucks, buses, motorhomes, motorcycles, etc., which are used to transport persons, materials, etc. In particular, the term motor vehicles for the transportation of people is included.

Preferably, the vehicle comprises a device for automated, and in particular for (partially) autonomous driving. The term "automated driving" can be understood in the context of the document as driving with automated longitudinal or lateral control or autonomous driving with automated longitudinal or lateral control. Automated driving may be, for example, long-time driving on the highway or limited time driving as part of parking or maneuvering. The term "automated driving" includes automated driving with any degree of automation. By way of example, degrees of automation are assisted, semi-automated, highly automated, or fully automated driving. These levels of automation were defined by the Federal Policy Administration for Road Engineering (Bundesanstalt für Straßenwesen BASt) (see BASt publication "Forschung Kompakt", Issue November 2012). During assisted driving, the driver permanently carries out longitudinal or lateral control, while the system carries out the other functions within certain limits. In semi-automated driving (TAF), the system takes on the longitudinal and lateral control for a certain period of time and/or in specific situations, wherein the driver has to monitor the system permanently as in assisted driving. In highly automated driving (HAF), the system takes on the longitudinal and lateral control for a certain period of time without the driver having to permanently monitor the system, but the driver must be able to take on driving the vehicle at a certain time. In fully automated driving (VAF), the system can handle a specific use case automatically in all situations; for this use case a driver is no longer required. The above four degrees of automation correspond to SAE levels 1 to 4 of SAE 13016 (SAE—Society of Automotive Engineering). For example, highly automated driving (HAF) Level 3 corresponds to the SAE J3016 standard. In addition, SAE J3016 still includes SAE level 5 as the highest degree of automation provided, which is not included in the definition of BASt. SAE level 5 corresponds to driverless driving, in which the system can automatically manage all situations in the manner of a human driver during the whole journey; a driver is generally no longer required.

According to another aspect of the present disclosure, a driving assistance method for a vehicle is specified. The driving assistance method involves determining a traffic density in a surrounding area of the vehicle based on surroundings data, and determination of a confidence value for the determined traffic density. Preferably, an automated driving function, in particular a lane change, can be carried out if the determined confidence value is equal to or greater than a threshold value. The threshold value can be 50% or more, preferably 70% or more, and even more preferably 80% or more.

In some embodiments, determining traffic density in a surrounding area of the vehicle involves determining individual traffic densities based on surroundings data and determining individual traffic densities and associated confidence values for two or more lanes. For example, the driving assistance method includes determining an initial traffic density for a first-party lane of the vehicle, determination of a first confidence value for the first traffic density, determination at least of a second traffic density for at least one adjacent lane of the vehicle, and determination of at least a second confidence value for the at least one second traffic density. The at least one adjacent lane of the vehicle may include or be a lane in the direction of travel of the vehicle ("first-party driving direction") and/or a lane in the opposite direction.

The driving assistance method can be implemented by the driving assistance system of the present disclosure. In addition, the method may include or carry out the aspects described in relation to the driving assistance system.

Exemplary embodiments of the disclosure are shown in the figures and are described in more detail below.

BRIEF DESCRIPTION OF THE DRAWINGS

The same reference characters are used for identical and equivalent elements below unless stated otherwise.

DETAILED DESCRIPTION OF THE DRAWINGS

Figure 1:
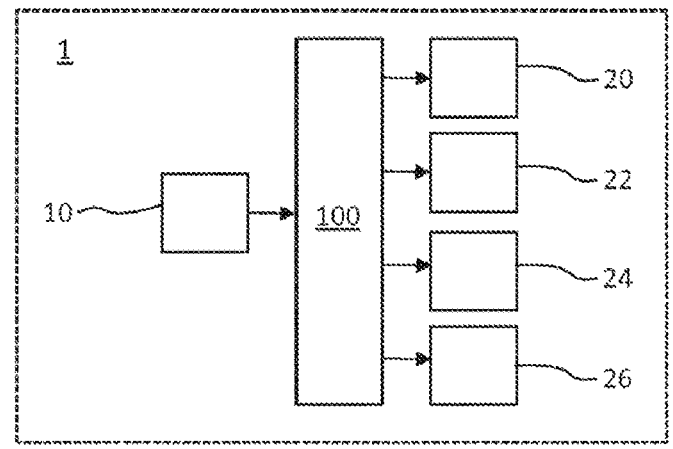
FIG. 1 shows schematically a vehicle with a driving assistance system according to embodiments of the present disclosure.

FIG. 1 shows schematically a vehicle 1 with a driving assistance system 100 according to embodiments of the present disclosure.

The driving assistance system 100 comprises a receiving unit which is set up to receive surroundings data of the vehicle 1, an evaluation unit which is set up to determine a traffic density in the surroundings of the vehicle 1 based on the surroundings data, and a determination unit that is set up to determine a confidence value for the traffic density determined by the evaluation unit. The receiving unit, the evaluation unit and the determination unit can be realized in a common software and/or hardware module. Alternatively, the receiving unit, the evaluation unit and the determination unit can be realized in separate software and/or hardware modules.

The surroundings data can be captured by an environment sensor system 10 of the vehicle 1. For example, objects (for example vehicles) and lanes can be detected. The environment sensor system 10 may include, for example, a LiDAR system, one or more radar systems and/or one or more cameras. For example, the environment sensor system 10 can include at least one front camera and/or at least one front radar and/or at least one side radar.

Preferably, the driving assistance system 100 comprises a device for an automated driving function. The device for an automated driving function may comprise a lane change assistant and/or an emergency stop assistant. The device can be set up to perform the automated driving function when the determined confidence value is equal to or greater than a threshold value. The threshold value can be 50% or more, preferably 70% or more, and even more preferably 80% or more. If the determined confidence value is less than the threshold value, the automated driving function cannot be performed. For example, no lane change can be carried out if the determined confidence value is less than the threshold value. In particular, when a stop function is triggered, no lane change can be carried out, for example to a stopping lane and the vehicle can be brought to a standstill on the first-party lane without changing lanes if the determined confidence value is less than the threshold value.

In the case of the automated driving function, such as a lane change, the longitudinal and lateral control of the vehicle 1 is carried out automatically. The driving assistance system 100 therefore takes over the control of the vehicle until the vehicle 1 is brought to a standstill. For this purpose, the driving assistance system 100 controls the drive 20, the (optional) gearbox 22, the (for example hydraulic) service brake 24 and the steering 26 by means of intermediate units that are not shown.

However, the present disclosure is not limited to this. The determined traffic density and the associated confidence value can be used as input for various functions or applications. For example, a plausibility check for at least one determined characteristic of the surroundings of the vehicle can be carried out based on the determined traffic density and the confidence value. For example, the specific traffic density and confidence value are used to check whether a first-party lane or an opposite direction lane were detected correctly (for example based on the surroundings data). With this, for example, stabilization of an environmental model can be carried out.

Figure 2:
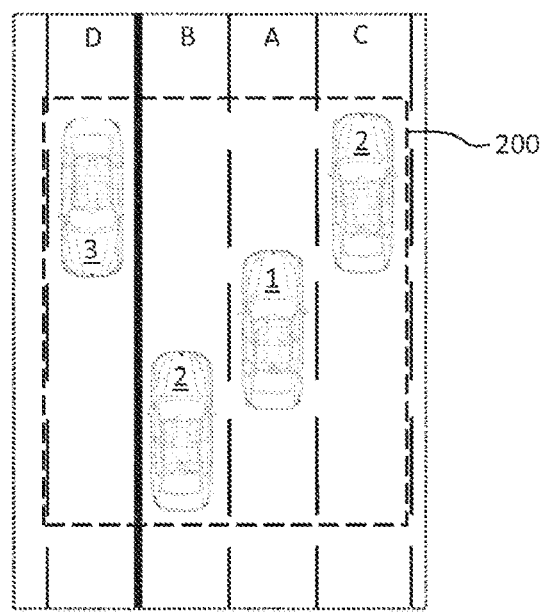
FIG. 2 shows an exemplary surrounding area of the vehicle.

FIG. 2 shows an exemplary surrounding area 200 of the vehicle 1, for which the traffic density is calculated.

The vehicle 1 (also referred to as a "first-party vehicle" or an "ego vehicle") is located on a first-party lane A. There may be at least one adjacent lane, such as one or more adjacent lanes in the first-party driving direction (for example the left adjacent lane B and the right adjacent lane C) and/or one or more opposite direction lanes D. In the example of FIG. 2, a third-party vehicle 2 is located in each of the adjacent lanes B and C of the first-party driving direction and a third-party vehicle 3 in the opposite direction lane D.

The surroundings data captured by the environment sensor system can be analyzed in order to detect objects and lanes in a surrounding area 200 defined around the vehicle. The surrounding area 200 can, for example, be determined or defined by a range of the environment sensor system. The objects, such as third-party vehicles, can be geometrically assigned to the lanes, such as lanes A-D. From this assignment, the traffic density per unit distance can be determined.

The determined traffic density can be made available for one or more uses, such as the lane change assistant and/or the emergency stop assistant. Additionally or alternatively, the determined traffic density can be transmitted to a backend. The backend can learn, for example, a road utilization (for example little used roads and much travelled roads). The learned road utilization can then be used, for example, for more time-efficient and/or more energy-efficient routing.

Figure 3A:
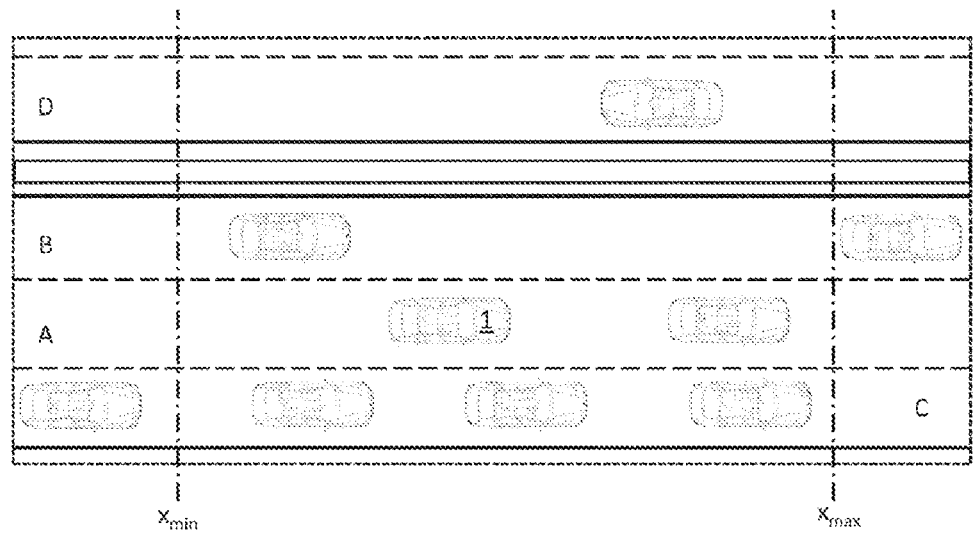
FIGS. 3A and B show exemplary traffic densities according to embodiments of the present disclosure.

FIGS. 3A and B show exemplary traffic densities according to embodiments of the present disclosure.

Advanced Driver Assistance Systems (ADAS) can provide a variety of monitoring and advice functions to facilitate control of the car. With the help of one or more sensors, the surroundings of the vehicle can be monitored and evaluated. For example, before changing lanes, the distance to the other vehicles and the respective speeds can be determined. For example, if a negative speed is detected for a car for example, then it is an opposite direction lane and a change to this lane can be ruled out. The system can therefore determine whether a lane change is safe and can, if necessary, bring the car into the correct position by adjusting the speed. In particular, an average speed can be determined for each lane and direction and the speed of the first-party vehicle can be adjusted based on this. By determining the traffic density on the individual lanes, safety during lane changes can be increased. In particular, vehicles can also be taken into account which are even further away, but possibly have a higher speed.

In some embodiments of the present disclosure, the traffic density can be used for the lane-changing assistant. Using the calculation of the confidence value, the probability that the determined traffic density is valid can be determined. Taking the confidence value into account can significantly improve safety during lane changes.

The traffic density can be determined as shown in FIGS. 3A and B using the surroundings data collected by the environment sensor system. For example, the position and speed are determined of all vehicles that are located in a given area, i.e. the (predetermined) surrounding area of the vehicle. Typically, an object is detected only when it corresponds to at least one predetermined object type (for example car, truck, motorcycle).

The surrounding area can have a longitudinal extent ds ("evaluation area") and a lateral extent. The longitudinal extent ds is defined along the direction of travel. The lateral extent is defined perpendicularly to the direction of travel.

For example, the longitudinal extent can be defined as $ds = x_{max} - x_{min}$, wherein $x_{max} - x_{min}$ are defined relative to a reference point, which may be on (or the) first-party vehicle. $x_{min}$, for example, can be the limit of the evaluation area behind the vehicle (for example a view behind the vehicle). $x_{max}$ can be the limit of the evaluation area in front of the vehicle (for example a view in front of the vehicle). In the example of FIGS. 3A and B, the longitudinal extent is defined by ±100 meters relative to the first-party vehicle, i.e. ds=200 m.

The lateral extent can be defined by the number of lanes. In the example of FIGS. 3A and B, the lateral extent is defined by the first-party driving lane, the left lane, the right lane and optionally the opposite direction lane.

The lanes or the road model can also be detected by means of the environment sensor system. The detected objects, and in particular the third-party vehicles, can be assigned to the respective lanes. From the assignment an individual traffic density for each of the lanes can be calculated. As soon as a new object in the surrounding area is detected, the traffic density can also be redefined.

Figure 3B:
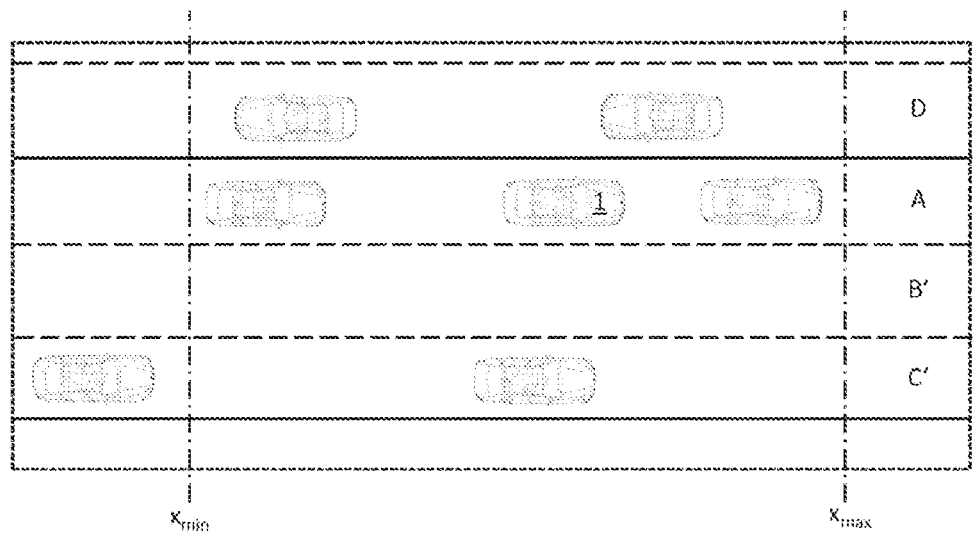

The traffic density for a lane can be defined as the number n of detected objects (in particular the third-party vehicles) per unit distance (for example ds). In particular, at least one traffic density for the first-party driving direction (VDE) and at least one traffic density for the opposite direction (VDG) can be defined. In the example of FIG. 3A, VDG on the opposite direction lane is l/ds. VDE on the first-party driving lane is l/ds, VDE on the left adjacent lane B is l/ds and VDE on the right adjacent lane C is 3/ds. In the example of FIG. 3B, VDG is 2/ds on the opposite direction lane. VDE on the first-party driving lane is 2/ds, VDE on the first adjacent lane B' is 0/ds and VDE on the second right adjacent lane C' is l/ds.

In some embodiments, only the left and/or right lanes directly adjacent to the first-party driving lane A can be taken into account for the automated driving function. In the example of FIG. 3A, these would be the left adjacent lane B and/or the right adjacent lane C. In the example of FIG. 3B, these would be the opposite direction lane D and/or the first right adjacent lane B'. This is particularly advantageous when a lane change to an immediately adjacent lane is carried out.

Figure 4:
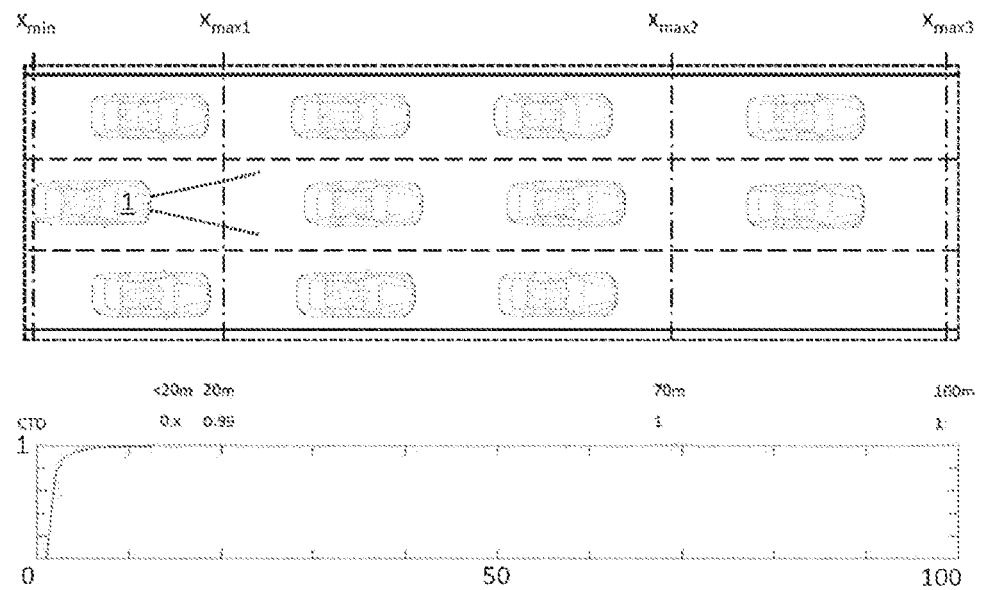
FIG. 4 shows by way of example the confidence value according to embodiments of the present disclosure.

FIG. 4 shows an exemplary determination of the confidence value for the traffic density in accordance with the present disclosure.

The traffic density determined based on the surroundings data of the environment sensors cannot be determined with 100% probability due to different influences (for example limited view). According to the embodiments of the present disclosure, the confidence value (confidence traffic density CTD) for the calculated traffic density is determined.

In some embodiments, the confidence value CTD for a lane may include one or more components. The components can be summed to obtain a total confidence value CTD. In particular, the weighted components can be summed. The components can be chosen from the group which includes (i) a (for example average) confidence value COB of detected objects (for example third-party vehicles), (ii) a confidence value CRM of a detected lane, and (iii) a confidence value CDS of a detection area of an environment sensor system of the vehicle (for example a viewing area).

The confidence value CTD for a lane can be calculated, for example, as follows:

$$CTD = k_1 \cdot COB + k_2 \cdot CRM + k_3 \cdot CDS$$

$k_1$, $k_2$ and k3 are weighting factors (for example constants). k1 and $k_2$ can be essentially the same in some embodiments. If no objects are detected within the detection range, COB is 0 (zero), and thus CTD becomes smaller. The greater the detection range, the number of detected objects, the confidence value thereof and the confidence value of a detected lane, the greater is the total confidence value CTD. According to the present disclosure, it can be that CTD~1 if the detection range is about 10 m.

The confidence value CTD can thus depend on the detected objects (for example how likely it is that the object is actually a vehicle), on the detected lanes (how likely is it that the detected lane actually exists) and on the viewing range. If the confidence value CTD is below a certain threshold value (for example 80%), then the calculation of traffic density is possibly not correct, and it is too risky to use the traffic density for the decision to change lanes. With this a higher level of safety in determining traffic density can be provided. In particular, wrong decisions due to erroneous traffic densities can be avoided.

Figure 5:
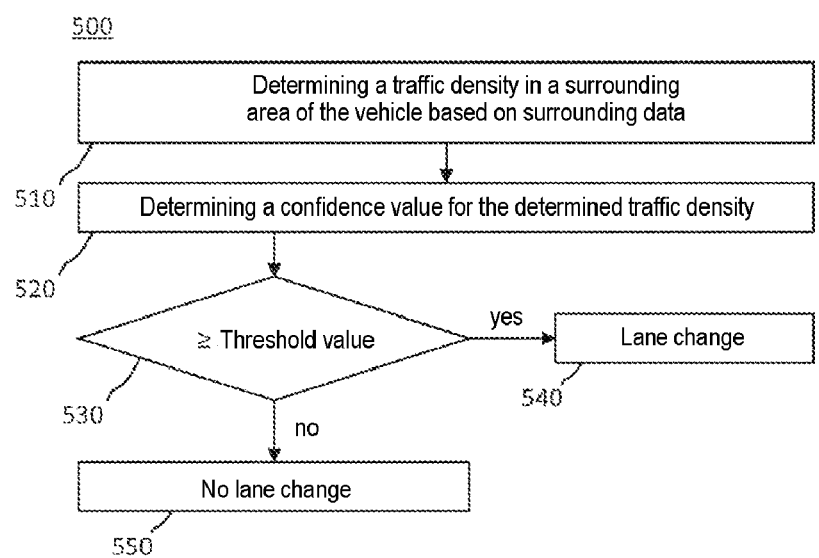
FIG. 5 shows a flow diagram of a driving assistance method according to embodiments of the present disclosure.

FIG. 5 shows a flow diagram of a method 500 for the emergency stopping of a vehicle according to embodiments of the present disclosure.

The driving assistance method 500 includes in block 510 a determination of a traffic density in a surrounding area of the vehicle based on surroundings data and in block 520 determination of a confidence value for the determined traffic density. In block 530, a comparison of the determined confidence value with a threshold value is carried out. If the determined confidence value is greater than or equal to the threshold value, a lane change is made in block 540. If the determined confidence value is less than the threshold value, no lane change is made in block 550.

According to the invention, a confidence value or a reliability for a calculated traffic density is determined, which indicates the probability that the calculated traffic density is correct.

For example, incorrect calculation of the traffic density can lead to dangerous situations. Thus, a closely approaching vehicle can obscure the view of vehicles driving further back. In addition, there may be vehicles that are not assigned to any lane or are assigned to the wrong lane, for example at the moment of a lane change. According to the present disclosure, a risk assessment can be carried out, for example for performing an automated driving function. If the automated driving function is a lane change and the confidence value of the calculated traffic density is low, for example, it can be decided that no lane change is carried out. In this way, potential hazardous situations can be avoided if the calculated traffic density is recognized as untrustworthy.

What is claimed is:

1. A driving assistance system for a vehicle, comprising:
an environment sensor system configured to receive surroundings data of the vehicle;
a processor;
a memory in communication with the processor and storing instructions executable by the processor to configure the driving assistance system to implement:
an evaluation unit configured to determine a traffic density in a surrounding area of the vehicle based on the surroundings data; and
a determination unit configured to determine a confidence value for the traffic density determined by the evaluation unit wherein
the confidence value comprises a weighted sum of:
a confidence value of objects detected on a lane,
a confidence value of a detected lane, and
a confidence value of a detection range of the environment sensor system of the vehicle; and
a device for an automated driving function, wherein the device is configured to carry out the automated driving function when the determined confidence value is greater than or equal to a threshold value.

2. The driving assistance system according to claim 1, wherein
the evaluation unit is further configured to detect at least one lane based on the surroundings data, and to determine the traffic density for the at least one lane.

3. The driving assistance system according to claim 1, wherein
the evaluation unit is further configured to determine a respective traffic density for two or more lanes, and
the determination unit is further configured to provide an individual confidence value for each of the traffic densities of the two or more lanes.

4. The driving assistance system according to claim 1, wherein
the device for an automated driving function is further configured to carry out at least one lane change.

5. The driving assistance system according to claim 1, wherein
the driving assistance system is configured to carry out a plausibility check for at least one determined characteristic of the surroundings of the vehicle based on the determined traffic density and the confidence value.

6. A vehicle comprising the driving assistance system according to claim 1.

7. A driving assistance method for a vehicle, comprising:
receiving surroundings data via an environment sensor system;
determining a traffic density in a surrounding area of the vehicle based on the surroundings data: and
determining a confidence value for the determined traffic density wherein
the confidence value comprises a weighted sum of:
a confidence value of a quantity of objects detected on a lane,
a confidence value of a detected lane, and
a confidence value of a detection range of the environment sensor system of the vehicle; and
carrying out an automated driving function when the determined confidence value is greater than or equal to a threshold value.

8. The driving assistance method according to claim 7, wherein
the determination of a traffic density in a surrounding area of the vehicle based on surroundings data comprises:
determining a first traffic density for a first-party lane of the vehicle;
determining a first confidence value for the first traffic density;
determining at least one second traffic density for at least one adjacent lane of the vehicle; and
determining at least a second confidence value for the at least one second traffic density.

9. The driving assistance method according to claim 7, wherein
the automated driving function is a lane change.

10. The driving assistance method according to claim 7, further comprising:
carrying out a plausibility check for at least one determined characteristic of the surroundings of the vehicle based on the determined traffic density and the confidence value.

* * * * *